(12) United States Patent
Sanders et al.

(10) Patent No.: US 8,446,590 B2
(45) Date of Patent: May 21, 2013

(54) OPTICAL FILTERING FOR RESONATOR-FIBER-OPTIC GYROSCOPES

(75) Inventors: Glen A. Sanders, Scottsdale, AZ (US); John Feth, Phoenix, AZ (US); Lee K. Strandjord, Tonka Bay, MN (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/150,990

(22) Filed: Jun. 1, 2011

(65) Prior Publication Data

US 2012/0307253 A1    Dec. 6, 2012

(51) Int. Cl.
*G01C 19/72* (2006.01)

(52) U.S. Cl.
USPC .......................................................... 356/461

(58) Field of Classification Search
USPC .................. 356/461, 460, 468, 469; 359/588
See application file for complete search history.

(56) References Cited

U.S. PATENT DOCUMENTS

| | | | | |
|---|---|---|---|---|
| 4,358,851 A | * | 11/1982 | Scifres et al. | 372/97 |
| 4,842,409 A | * | 6/1989 | Arditty et al. | 356/460 |
| 5,732,170 A | | 3/1998 | Okude et al. | |
| 6,241,397 B1 | | 6/2001 | Bao et al. | |
| 6,700,706 B2 | | 3/2004 | Chang et al. | |
| 6,859,118 B2 | | 2/2005 | Marquardt | |
| 7,386,018 B2 | * | 6/2008 | Mori et al. | 372/18 |
| 7,522,284 B2 | * | 4/2009 | Sanders et al. | 356/461 |
| 7,933,020 B1 | | 4/2011 | Strandjord et al. | |
| 2006/0098694 A1 | | 5/2006 | Hongo | |
| 2007/0242276 A1 | * | 10/2007 | Hughes et al. | 356/461 |
| 2008/0079947 A1 | * | 4/2008 | Sanders et al. | 356/461 |
| 2010/0290057 A1 | | 11/2010 | Qiu et al. | |

FOREIGN PATENT DOCUMENTS

EP    2078970    7/2009

OTHER PUBLICATIONS

European Patent Office, "European Search Report", "from Foreign Counterpart of U.S. Application", Sep. 19, 2012, pp. 1-3, Published in: EP.
European Patent Office, "Office Action", "from Foreign Counterpart of U.S. Appl. No. 13/150,990", Oct. 10, 2012, pp. 1-5, Published in: EP.

\* cited by examiner

*Primary Examiner* — Tarifur Chowdhury
*Assistant Examiner* — Jonathan Hansen
(74) *Attorney, Agent, or Firm* — Fogg & Powers LLC

(57) ABSTRACT

An optical-fiber filter is provided. The optical-fiber filter includes an optical fiber having a first end-face and an opposing second end-face. The first end-face and the second end-face set a fiber length. The first end-face and the second end-face are coated with reflective coatings. When an optical beam emitted from a laser is coupled into one of the first end-face or the second end-face, an optical beam output from the opposing end-face has a narrow linewidth and low frequency noise fluctuations.

19 Claims, 5 Drawing Sheets

OPTICAL FILTERING FOR RESONATOR-FIBER-OPTIC GYROSCOPES

This invention was made with Government support under N00014-08-C-0665 awarded by Office of Naval Research. The Government has certain rights in the invention.

BACKGROUND

A resonator-fiber-optic gyroscope (RFOG) is a rotation rate measurement apparatus that uses a fiber ring resonant cavity to enhance the signal to noise ratio in the measurement of rotation-induced Sagnac effect within the resonant cavity. The basic principle of RFOG operation is that the effective resonator path length in a clockwise (CW) and counter-clockwise (CCW) direction is different when the rotation of the fiber ring resonant cavity has a nonzero component in a resonator axis. By measuring the CW and CCW resonance frequency difference, which is proportional to Sagnac phase shift due to rotation, the RFOG can accurately measure the rotation rate.

Lasers provide coherent light to the fiber resonator to identify its resonance frequencies. Semiconductor lasers are a low cost option for source lasers. However, semiconductor lasers typically have significant phase noise that can lead to degradation of the RFOG performance.

SUMMARY

The present application relates to an optical-fiber filter. The optical-fiber filter includes an optical fiber having a first end-face and an opposing second end-face. The first end-face and the second end-face set a fiber length. The first end-face and the second end-face are coated with reflective coatings. When an optical beam emitted from a laser is coupled into one of the first end-face or the second end-face, an optical beam output from the opposing end-face has a narrow linewidth and low frequency noise fluctuations.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

In order for laser diodes to be used in a resonator-fiber-optic gyroscope (RFOG) without degrading performance, the phase noise of lasers must be reduced. Embodiments of the resonator-fiber-optic gyroscopes described herein include a frequency stabilized reference laser to provide a reference optical beam with low phase noise for the RFOG system. The lasers (slaves) that are used for measuring the resonance frequency of the sensing resonator are phase locked with a servo to the reference (master) laser so that the low phase noise of the master laser within the servo bandwidth is transferred to the slave lasers. The master laser is frequency stabilized by using a frequency discriminator in a negative feedback loop that controls out the phase/frequency fluctuations of the master laser. Thus, the slave lasers have low noise within the bandwidth of the electro-optic servo.

The embodiments of the resonator-fiber-optic gyroscopes described herein include optical-fiber filters coupled to receive output from each slave laser. The optical-fiber filters reduce the remaining phase noise of each laser; namely phase fluctuations at higher frequencies than the servo bandwidth. Outputs from the optical-fiber filters are used to probe the resonances of the fiber resonator coil (gyro sensing coil). The optical-fiber filters have the desired features needed for high performance rotation measurement by the RFOG. These desired features include very narrow bandwidth, small size, high power handling capability, low spurious back reflections, manufacturability, tunability, and potential for low cost. The optical-fiber filter described herein is a very high finesse, narrow linewidth, and low cost filter.

Figure 1:
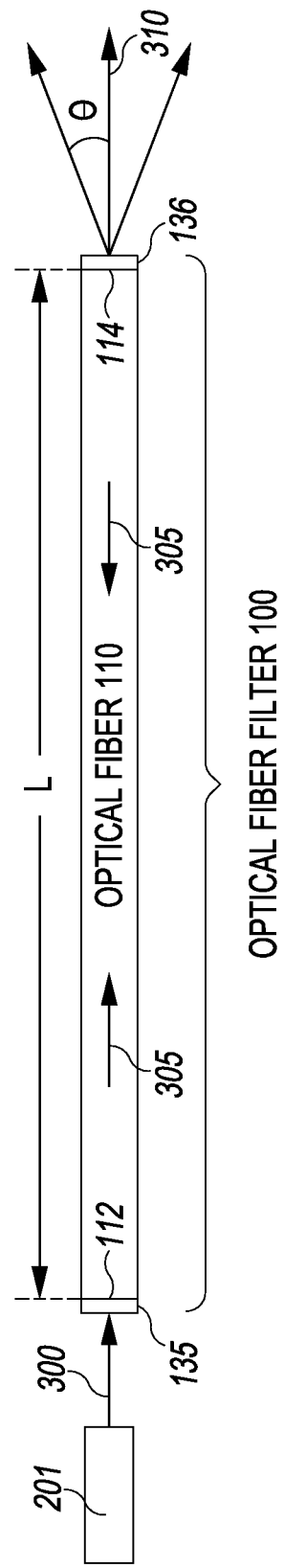
FIG. 1 is a block diagram of one embodiment of an optical-fiber filter in accordance with the present invention.

FIG. 1 is a block diagram of one embodiment of an optical-fiber filter 100 in accordance with the present invention. The optical-fiber filter 100 includes a solid core optical fiber 110 that has a first end-face 112 and an opposing second end-face 114. The distance between the first end-face 112 and the second end-face 114 sets (determines the extent of) the fiber length L. The first end-face 112 is coated with a reflective coating 135. The second end-face 114 is coated with a reflective coating 136. In one implementation of this embodiment, the reflective coating 135 and reflective coating 136 include one or more layers of material deposited on the first end-face 112 and the second end-face 114, respectively. In another implementation of this embodiment, the reflective coating 135 and reflective coating 136 are a plurality of dielectric layers.

As shown in FIG. 1, a laser 201 emits an optical beam 300 (represented by an arrow). The optical beam 300 is incident on the reflective coating 135 and the end-face 112 and is coupled to the optical fiber 110. The reflective coatings 135 and 136 form a resonant cavity so the optical beam 305 coupled into the optical fiber 110 is reflected multiple times between the reflective coating 135 and reflective coating 136. The term "coupling" as used herein is "optically coupling" in which at least a portion of light (depending on the coupling efficiency) emitted (output) from a source (a laser or an optical fiber) is coupled into a receiving optical fiber. The coupling can be provided directly from the source to the receiving optical fiber (e.g., butt-coupling) or the coupling can be provided by optical elements positioned between the source and the receiving optical fiber to align and direct the optical beam output from the source. The coupled light propagates in the receiving optical fiber. The coupling efficiency is maximized when the numerical aperture of the source and fiber are matched. In one implementation of this embodiment, lenses (not shown) are arranged between the source and fiber to optimize the coupling.

The optical beam 310 that is output from the opposing second end-face 114 through the reflective coating 136 has a narrow linewidth and low frequency noise fluctuations. In one implementation of this embodiment, the finesse of the resonator cavity formed by the reflective coating 135 and reflective coating 136 is 1000 and the length of the fiber is approximately 5 meters and the linewidth of the optical beam 310 is 20 KHz. In another implementation of this embodiment, the finesse of the resonator cavity formed by the reflective coating 135 and reflective coating 136 is 200 and the length of the fiber is approximately 5 meters and the linewidth of the optical beam 310 is 100 KHz. In one implementation of this embodiment, the reflective coating 135 and reflective coating 136 are Bragg gratings written within the fiber to produce the desired reflectivity.

The optical-fiber filter 100 is bidirectional, so when an optical beam 300 emitted from a laser 201 is coupled into either the first end-face 112 or the second end-face 114, an optical beam output 310 from the opposing end-face has a narrow linewidth and low frequency noise fluctuations.

In the optical-fiber filter 100, the angle of the end-face cleave must be specified to promote the multiple reflections within the fiber 110 (typically, 90 degrees with respect to the core of the fiber), and the length L of the fiber, the reflectivities $R_1$ and $R_2$ of the coatings, and the mode field size and numerical aperture (NA) of the fiber must be selected to: 1) reduce the possibility of Stimulated Brillouin Scattering and other non-linear effects; 2) allow the desired power throughput; 3) achieve the desired filter linewidth; and 4) allow for the desired packaging bend diameter. The divergence angle θ of the optical beam 310 and the index of refraction n of the optical fiber 110 are used to calculate the numerical aperture NA, which is NA=n sin θ, where n is the refractive index of the medium outside the optical filter. The reflectivities $R_1$ and $R_2$ each represent the ratio of the light intensity reflected (from the surfaces) to the intensity of light incident on that surface.

Figure 2:
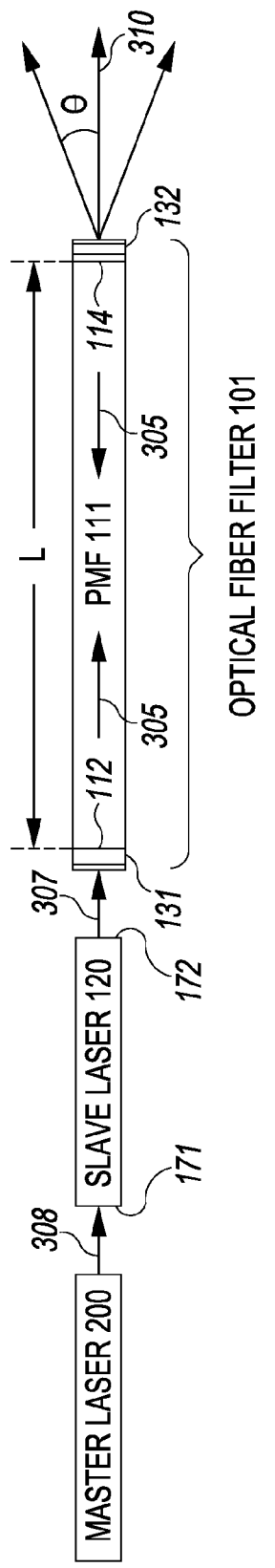
FIG. 2 is a block diagram of one embodiment of an optical-fiber filter in accordance with the present invention.

FIG. 2 is a block diagram of one embodiment of an optical-fiber filter 101 in accordance with the present invention. The optical-fiber filter 101 includes a solid core polarization maintaining fiber (PMF) 111 that has a first end-face 112 and an opposing second end-face 114. Advantageously, the reflective coatings can be directly formed on the ends of the polarization maintaining fiber 111 so the polarization maintaining fiber 111 becomes a high finesse resonator. The first end-face 112 is coated a first plurality of dielectric layers (thin film layers) that form a reflective coating 131. The second end-face is coated with a second plurality of dielectric layers (thin film layers) that form a reflective coating 132. In one implementation of this embodiment, the reflective coatings 131 and 132 are each a single thin film layer.

As shown in FIG. 2, a master laser 200 emits an optical beam 308 (represented by an arrow). In one implementation of this embodiment, the master laser 200 is a frequency stabilized master laser outputting a reference optical beam 308 having low phase noise. For example, the optical beam 308 can have a frequency noise substantially smaller than a few Hz/√Hz within the servo bandwidth, but may have much higher noise level at frequency region higher than servo bandwidth. The optical beam 308 output from the master laser 200 is used to phase lock the slave laser 120. The slave laser 120 emits an optical beam 307 from the output end-face 172. The optical beam 307 is coupled into the optical-fiber filter 101. The coupled optical beam 305 propagates multiple times in the resonant cavity formed in the polarization maintaining fiber 111 between the reflective coating 131 and reflective coating 132. The optical beam 310 that is output from the opposing second end-face 114 through the reflective coating 136 has a narrow linewidth and low frequency noise fluctuations. For example, the optical beam 310 can have a frequency noise level substantially lower than a few Hz/√Hz outside servo bandwidth.

The coatings 131 and 132 are typically a dielectric stack designed for the desired transmission and reflection with low loss. The desired coatings 131 and 131 are low loss, highly reflective mirrors with a small amount of transmission, so that light incident on the input end-face 171 and the output end-face 172 is mostly reflected back into the fiber to produce a resonator. The small coefficient of transmission allows some light to be coupled into and out of the fiber resonator 100 or 101. As shown in FIGS. 1 and 2, both ends of the fibers 110 and 111 are coated. In one implementation of this embodiment, the reflectivity $R_1$ of the reflective coating 135 (131) is 0.98 and reflectivity $R_2$ of the reflective coating 136 (or 132) is 0.97. In another implementation of this embodiment, the reflectivity $R_1$ of the reflective coating 135 (131) is 0.98 and reflectivity $R_2$ of the reflective coating 136 (or 132) is 0.98. In yet another implementation of this embodiment, the reflectivity $R_1$ of the reflective coating 135 (131) is 0.983 and reflectivity $R_2$ of the reflective coating 136 (or 132) is 0.983.

The resonator round-trip path length 2L is uniquely defined as the path length from the first fiber end-face 112, through the fiber 110 or 111 to the second coated fiber end-face 114, and back through the fiber 110 or 111 to the first fiber end-face 112. This provides for maximum stability of the optical-fiber filter 100 or 101. The longer the optical-fiber filter is, the narrower (smaller) the linewidth of the output optical beam. High finesse and narrow linewidth are desirable conditions to provide an optical-fiber filter (low pass filter) with a low cutoff frequency. The lower the cutoff frequency of the filter is, the lower the laser frequency noise. In summary, the higher the finesse and the narrower the linewidth, the lower the corner frequency and the more effective the optical-fiber filter is at reducing laser frequency noise. The transfer function for passing frequency noise fluctuations looks like that of a low pass electrical filter, where the filter does not reduce frequencies below its corner frequency, but rolls off, or progressively attenuates frequencies further and further beyond its corner frequency. The corner frequency is proportional to its linewidth.

The optical fibers 110 (FIG. 1) and 111 (FIG. 2) have a relatively long path length and thus, provide a long optical delay time for filtering high frequency noise. Careful design of the optical-fiber filter 101 (100) is required to ensure the resonant optical beam does not excite non-linear effects in the fiber's core. These non-linear effects, such as the Kerr Effect, and Stimulated Brillouin Scattering (SBS), degrade the stability of the optical-fiber filter and diminish the usefulness of the output beam 310. In an optical resonator, the power circulating in the optical-fiber filter is much more intense than the output. If the circulating power is too high within the optical-fiber filter, stimulated Brillouin scattering (SBS) is generated. Stimulated Brillouin scattering causes large intensity fluctuations which corrupt the output of the optical-fiber filter. The fiber length L, the reflective coating 131 (135) on the first end-face 112, the reflective coating 132 (136) on the second end-face 114, a mode field size of the optical fiber 111 (110), and a numerical aperture NA of the optical fiber 111 (110) are selected to prevent generation of non-linear effects in the optical fiber 111 (110) when the optical fiber 111 (110) functions as an optical resonator.

The limits of an exemplary optical-fiber filter 101 designed to prevent generation of non-linear effects are now described. The exemplary fiber 111 in the optical-fiber filter 101 is a polarization maintaining (PM) fiber with a loss of 60 ppm/meter and a mode field diameter of 10.6µ. The power threshold at which the SBS begins ($P_{crit\ Brill}$) is related to the physical area of the fiber core, A, in m$^2$; the fiber loss, α, in m$^{-1}$; and the gain coefficient of the guiding medium, $G_B$, in m/Watt; and the length L of the fiber in meters. Specifically, $P_{crit\ Brill}$ is calculated based on the following equation, where "*" is representative of the multiplicative sign: $P_{crit\ Brill} = 21*[(\alpha * A_{eff})/(\rho * g_B *(1-e^{-(\alpha L)}))]$. For a nominal 10 meter polarization maintaining fiber 111 in which the loss α is 0.25 dB/km (~60 ppm/m), the fraction ρ of power in glass is 1 (i.e., for a solid core), the SBS gain $G_B$ is 5×10$^{-11}$ meters/Watt (for silica), and a fiber mode field area is 8.8×10$^{-11}$ meters$^2$, the power threshold for SBS, $P_{crit\ Brill}$, is 3.7 Watts.

Table 1 shows the finesse, output power, and circulating power as a function of length L of the PM fiber 111 for a 200 KHz optical-fiber filter 101 with 200 kHz full-width-half-maximum (FWHM) peaks in the Airy function. Table 1 also shows the transmission (T) of the reflective coating. The circulating power column lists power circulating in the resonant filter in terms of unity input; the circulating power (W) column gives the circulating power in Watts, which is useful in estimating Brillouin threshold, based on an input of 60 mW.

When a 60 mW laser beam is coupled into the exemplary optical-fiber filter 101 described above, the circulating power does not exceed the Brillouin threshold for the lengths of fiber shown in Table 1 (e.g., less than 5 meters). The output and circulating powers shown in Table 1 are normalized to unity input power. The circulating power in watts assumes 60 mW input power.

TABLE 1

| Length (meters) | Finesse | Output Power | Circulating Power | Circulating Power (W) | T |
|---|---|---|---|---|---|
| 3.0 | 172 | 0.875 | 54.90 | 3.29 | 0.0170 |
| 3.5 | 147 | 0.890 | 47.09 | 2.82 | 0.0200 |
| 4.0 | 129 | 0.901 | 41.17 | 2.47 | 0.0231 |
| 4.5 | 115 | 0.910 | 36.59 | 2.20 | 0.0261 |
| 5.0 | 103 | 0.917 | 32.93 | 1.98 | 0.0291 |

Figure 3:
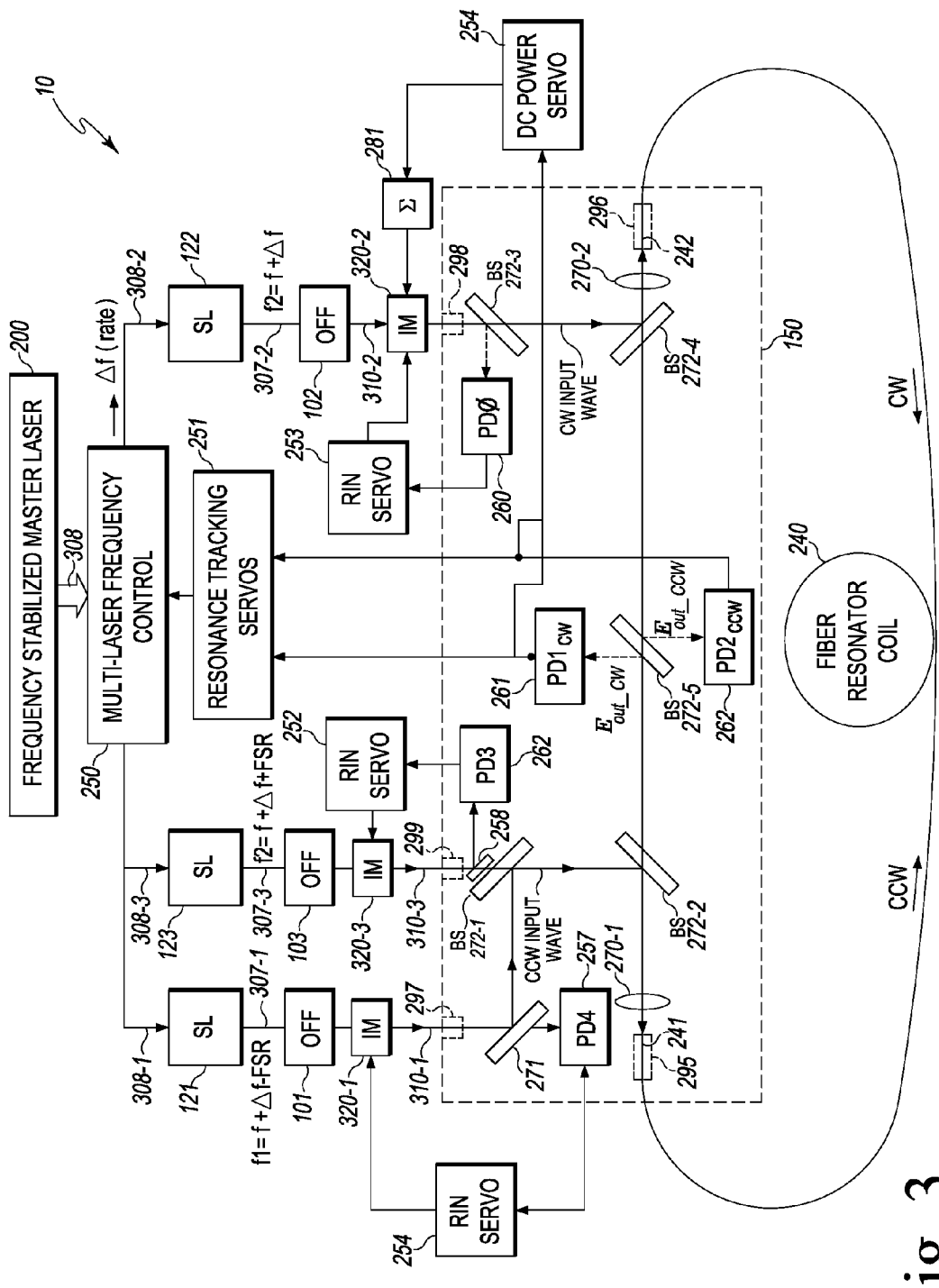
FIG. 3 is a block diagram of one embodiment of a resonator-fiber-optic gyroscope system that includes optical-fiber filters in accordance with the present invention.

FIG. 3 is a block diagram of one embodiment of a resonator-fiber-optic gyroscope (RFOG) system 10 that includes optical-fiber filters 101, 102, 103 in accordance with the present invention. The RFOG system 10 is also referred to herein as "resonator-fiber-optic gyroscope (RFOG) 10". The RFOG system 10 is a high performance gyroscope system. The frequency noise of each laser is reduced by the use of the optical-fiber filters 101, 102, 103. The RFOG 10 includes a frequency stabilized master laser 200, three slave lasers (SL) 121, 122, and 123, three respective optical-fiber filters (OFF) 101, 102, and 103, three respective intensity modulators (IM) 320-1, 320-2, and 320-3, and a fiber resonator coil 240. The fiber resonator coil 240 is an optical fiber ring resonator that forms a fiber ring resonant cavity in the gyroscope. The fiber resonator coil 240 is also referred to herein as "fiber loop 240" and "sensing resonator 240". The fiber loop 240 is the optical fiber through which at least two optical beams counter-propagate. The output of the fiber loop 240 is used to determine the rate of rotation of the RFOG 10. In one implementation of this embodiment, there are only two optical-fiber filters 101 and 102 in the RFOG and two respective slave lasers 121 and 122. In another implementation of this embodiment, the master laser 200 and the three slave lasers (SL) 121, 122, and 123 are semiconductor laser diodes.

The frequency stabilized master laser 200 emits a reference optical beam 308. The reference optical beam 308 has low phase noise (e.g., less than 1 Hz/√Hz). The beam 308 is used to generate radio frequency (RF) beat signals between the master and slave lasers, which are used by phase locked loop (PLL) 250 (also referred to herein as "multi-laser frequency control 250") to lock the slave lasers 121, 122, and 123 to the master laser 200 with frequency separations determined by the resonance tracking servos 251. These beat signals are used by multi-laser frequency control 250, which receives feedback from resonance tracking servos 251, to precisely control the frequency of the optical beams of the respective slave lasers 121, 122, and 123.

The slave lasers 121, 122, and 123 have similar structure and function to the slave laser 120 shown in FIG. 2. As shown in FIG. 3, the slave laser 121 is locked to the reference optical beam 308-1 such that slave laser 121 emits light at a first frequency $f_1 = f + \Delta f - FSR$, where f is the central frequency of master laser 200, Δf is a frequency offset from the central frequency f, and the FSR is the free spectral range of the sensing resonator 240. The free spectral range (FSR) is the wavelength separation between adjacent resonance peaks of the sensing resonator 240. The slave laser 122 is locked to the reference optical beam 308-2 such that slave laser 123 emits light at a second frequency $f_2 = f + \Delta f$. The slave laser 123 is locked to the reference optical beam 308-3 such that slave laser 123 emits light at a third frequency $f_3 = f + \Delta f + FSR$.

The optical-fiber filters 101, 102, and 103 are arranged so that the respective output optical beams 307-1, 307-2, and 307-3 emitted from the slave lasers 121, 122, and 123 are coupled to the respective optical-fiber filters 101, 102, and 103. The optical-fiber filters 101, 102, and 103 output low-noise, coherent optical beams 310-1, 310-2, and 310-3, respectively. The low-noise, coherent optical beams 310-1, 310-2, and 310-3 are coupled into respective intensity modulators 320-1, 320-2, and 320-3. As is known in the art, as the frequency noise of an optical beam is reduced, the coherence of the optical beam is increased.

The fiber resonator coil 240 is an optical fiber that has a first coil end-face represented generally at 241 and a second coil end-face represented generally at 242. The low-noise, coherent optical beams 310-1 and 310-3 output from the optical-fiber filters 101 and 103 are coupled to the first coil end-face 241 of the fiber resonator coil 240 via the respective intensity modulators 320-1 and 320-3. The low-noise, coherent optical beam 310-2 output from the optical-fiber filter 102 is coupled to the second coil end-face 242 of the fiber resonator coil 240 via the intensity modulator 320-2.

The optical-fiber filters 101, 102, and 103 each comprises an optical fiber 111 having a first end-face 112 and an opposing second end-face 114. The first end-face 112 and the second end-face 114 are coated with reflective coatings 131 and 132, respectively. In one implementation of this embodiment, the optical-fiber filters 101, 102, and 103 are similar in structure and function to the optical-fiber filter 100 shown in FIG. 1.

The optical beam 307-1 emitted from the first slave laser 121 is coupled to the first end-face 112 of the first optical-fiber filter 101. A first low-noise, coherent optical beam 310-1 is output from the second end-face 114 of the first optical-fiber filter 101 and is coupled (via the intensity modulator 320-1 and optical elements including beam splitters 271, 272(1-2) and lens 270-1) to the first coil end-face 241 of the fiber resonator coil 240. Other coupling configurations of optical elements are possible as is understandable to one skilled in the art. The portion of the optical beam 310-1 coupled into the fiber resonator coil 240 at the first coil end-face 241 propagates through the fiber resonator coil 240 in a counter-clockwise (CCW) direction.

The optical beam 307-2 emitted from the second slave laser 122 is coupled to the first end-face 112 of the second optical-fiber filter 102. A second low-noise, coherent optical beam 310-2 is output from the second end-face 114 of the second optical-fiber filter 102 and is coupled (via the intensity modulator 320-2 and optical elements including beam splitters 272(3-4) and lens 270-2) to the second coil end-face 242 of the fiber resonator coil 240. The portion of the optical beam 310-2 coupled into the fiber resonator coil 240 at the second coil end-face 242 propagates through the fiber resonator coil 240 in a clockwise (CW) direction.

The optical beam 307-3 emitted from the third slave laser 131 is coupled to the first end-face 112 of the third optical-fiber filter 103. A third low-noise, coherent optical beam 310-3 is output from the second end-face 114 of the third optical-fiber filter 103 and is coupled (via the intensity modulator 320-3 and optical elements including the beam splitters 272(1-2) and lens 270-1) to the first coil end-face 241 of the fiber resonator coil 240. The portion of the optical beam 310-3 coupled into the fiber resonator coil 240 at the first coil end-face 241 propagates through the fiber resonator coil 240 in a counter-clockwise (CCW) direction. In one implementation of this embodiment, the lenses 270(1-2) are ball lenses.

The light coupled into the fiber resonator coil 240 circulates multiple times within the fiber resonator coil 240 by transit through the lenses 270-1 and 270-2 and the beam splitters 272-2, 272-5, and 272-4. A portion (e.g., 1 to 20%) of the light propagating in the clockwise (CW) direction is reflected by beam splitter 272-5 into the detector ($PD1_{CW}$) 261. A portion (e.g., 1 to 20%) of the light propagating in the counter-clockwise (CCW) direction is reflected by beam splitter 272-5 into the detector ($PD2_{CCW}$) 262. Information indicative of the amount of optical power detected at the detectors 261 and 262 is sent as signals to the resonance tracking servos 251 and to the DC power servo 254. The resonance tracking servos 251 send signals to the multi-laser frequency control 250, which adjust the frequency of the optical beams of the slave lasers 121, 122, and 123, as needed, to resonance peaks of the sensing resonator 240. The DC power servo 254 sends signals to the summation circuit (Σ) 281 to adjust the power of the optical beam 310-2 output from the optical-fiber filter 102 through the intensity modulator (IM) 320-2. This adjustment is done in order to balance the power in CW and CCW direction so that optical Kerr effect induced cavity length difference is minimized.

The exemplary RFOG 10 shown in FIG. 3 also includes a relative intensity noise (RIN) detector (PD3) 262 that receives a portion (e.g., 1 to 10%) of the optical beam 310-3 from the intensity modulator 320-3 via beam splitter 258. RIN detector 262 measures the intensity noise of the optical beam 310-3 (before it is combined with the optical beam 310-1) that is being input to the first coil end-face 241 of the fiber resonator coil 240. The RIN signal from the RIN detector 262 provides signal feedback to a RIN servo electronic system 252. The electronic signal sent to the intensity modulator 320-3 from the RIN servo electronic system 252 adjusts the total light intensity of the input optical beam 310-3 passing through the intensity modulator 320-3, so that the undesirable fluctuations in intensity due to RIN are eliminated or substantially reduced. In this manner, the RIN servo loop is used to reduce the intensity noise or unwanted intensity or amplitude modulation of the input optical beam 310-3 passed through intensity modulator 320-3.

The exemplary RFOG 10 shown in FIG. 3 also includes a relative intensity noise (RIN) detector (PD4) 257 that receives a portion (e.g., 1 to 10%) of the optical beam 310-1 from the intensity modulator 320-1. RIN detector 257 measures the intensity noise of the optical beam 310-1 (before it is combined with beam 310-3) that is being input to the first coil end-face 241 of the fiber resonator coil 240. The RIN signal from the RIN detector 257 provides signal feedback to a RIN servo electronic system 254. The electronic signal sent to the intensity modulator 320-1 from the RIN servo electronic system 254 adjusts the total light intensity of the input optical beam 310-1 passing through the intensity modulator 320-1, so that the undesirable fluctuations in intensity due to RIN are eliminated or substantially reduced. In this manner, the RIN servo loop is used to reduce the intensity noise or unwanted intensity or amplitude modulation of the input optical beam 310-1 passed through intensity modulator 320-1.

The exemplary RFOG 10 shown in FIG. 3 also includes a RIN detector (PD0) 260 that receives a portion (e.g., 1 to 10%) of the optical beam 310-2 from the intensity modulator 320-2. The RIN signal from the RIN detector 260 provides signal feedback to a RIN servo electronic system 253. The electronic signal sent to the intensity modulator 320-2 from the RIN servo electronic system 253 adjusts the total light intensity of the input optical beam 310-2 passing through the intensity modulator 320-2, so that the undesirable fluctuations in intensity due to RIN are eliminated or substantially reduced. In this manner, the RIN servo loop is used to reduce the intensity noise or unwanted intensity or amplitude modulation of the input optical beam 310-2 passed through intensity modulator 320-2.

The exemplary RFOG 10 shown in FIG. 3 also includes a silicon optical bench (SiOB) 150. The silicon optical bench 150 includes grooves 295 and 296 etched into a surface of the silicon optical bench 150 to optically align the first fiber coil end-face 241 and the second coil end-face 242 to each other. The silicon optical bench 150 also includes provisions (such as, grooves, alignment features, or trenches) for positioning of optical elements (such as, lenses, beam splitters, and/or mirrors) used to align and direct optical beams 310-1, 310-3 into fiber end-face 241, and beam 310-2 into fiber end-face 242. The first coil end-face 241 of the fiber resonator coil 240 is positioned in a first groove 295 in the silicon optical bench 150. The second coil end-face 242 of the fiber resonator coil 240 is positioned in the second groove 296 in the silicon optical bench 150. The grooves 295 and 296 are etched to a depth such that the center of the core of the optical fiber of the fiber resonator coil 240 is precisely aligned to the optical beams 310(1-3) when the first coil end-face 241 and the second coil end-face 242 are positioned in the grooves 295 and 296. Likewise, the grooves 295 and 296 are etched to a depth such that the core of the first coil end-face 241 and the second coil end-face 242 are aligned to each other to create the fiber ring resonant cavity.

Figure 4:
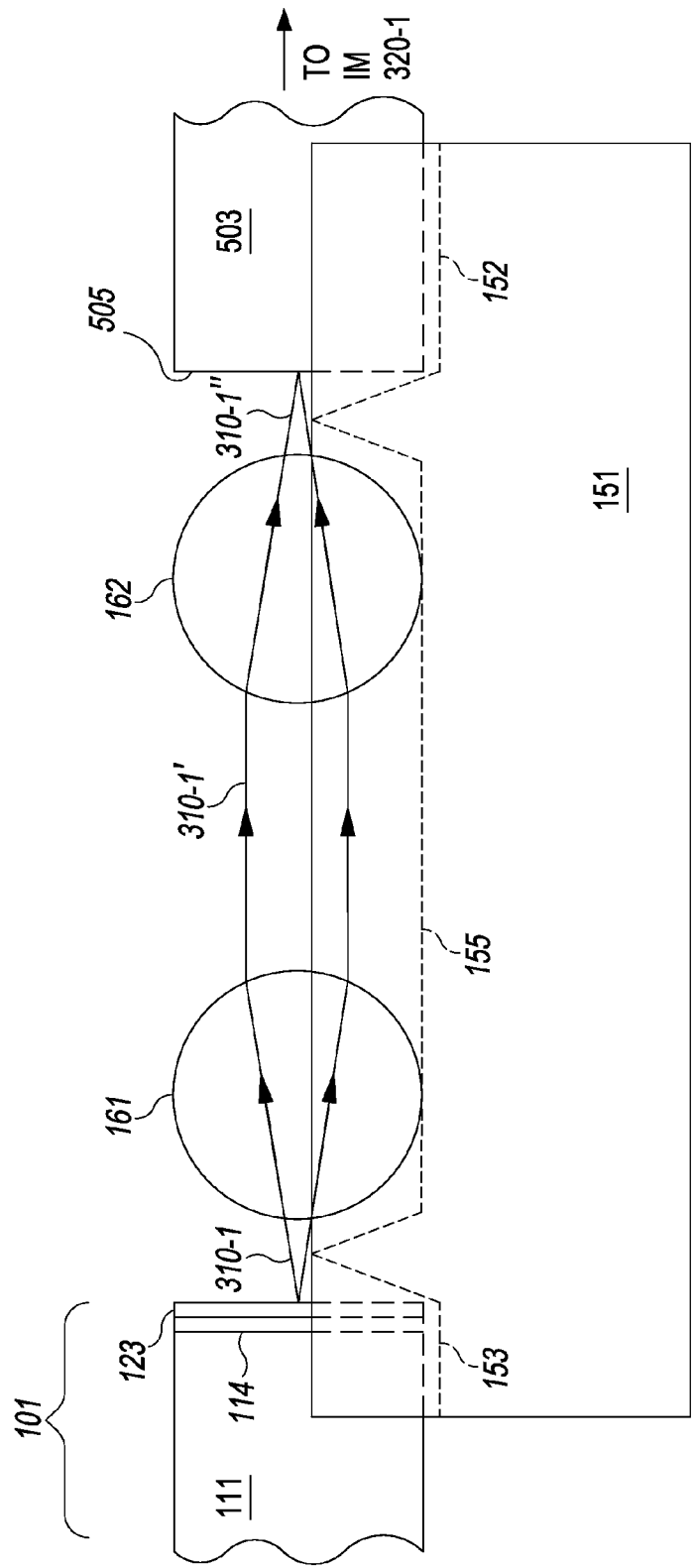
FIG. 4 is a block diagram of one embodiment of an optical-fiber filter coupled to a pigtailed intensity modulator in accordance with the present invention.

FIG. 4 is a block diagram of one embodiment of an optical-fiber filter 101 coupled to a pigtailed intensity modulator 320-1 (FIG. 3) in accordance with the present invention. In this embodiment, a fiber pigtail 503 with an end-face 505 is coupled to couple the input beam 310-1 to the intensity modulator 320-1. The end-face 505 of the fiber pigtail 503 is positioned in a groove 152 of a silicon substrate 151. The first ball lens 161 and the second ball lens 162 are positioned in an etched region 155 of the silicon substrate 151. The output end of the optical-fiber filter 101 is positioned in a groove 153 (also referred to herein as third groove 153) in the silicon optical bench 151. The two ball lenses 161 and 162 couple the optical beam 310-1 output from the optical-fiber filter 101 into the end-face 505 of the fiber pigtail 503 of the intensity modulator 320-1.

As shown in FIG. 4, the first ball lens 161 and the second ball lens 162 are positioned to collimate the low-noise, coherent optical beam propagating there between. In this exemplary alignment, the optical beam 310-1 coupled from the optical-fiber filter 101 to the first ball lens 161 exits the first ball lens 161 as a collimated optical beam 310-1'. The collimated optical beam 310-1' is incident on the second ball lens 162. The second ball lens 162 focuses the light as optical beam 310-1" on the end-face 505 of the fiber pigtail 503 of the intensity modulator 320-1. In one implementation of this embodiment, optical components (such as beam splitters 272 (1-2) are positioned in the collimated optical beam 310-1' to direct the light 310-1' between the first ball lens 161 and the second ball lens 162. In such an embodiment, there may be trenches (not shown in the silicon optical bench 151) to hold the light directing components. In like manner, the output of the intensity modulator 320-1 may be coupled into the silicon optical bench 150 by laying an output fiber pigtail (not shown) of the intensity modulator 320-1 into groove 297 (FIG. 3) to couple input beam 310-1 into the resonator fiber end-face 241 via beam splitters 271, 272(1-2) and lens 270-1 located on the silicon optical bench 150 (FIG. 3).

A similar arrangement is possible to couple the optical beams 310-2 and 310-3 output from the optical-fiber filters 102 and 103, respectively, to fiber pigtails of the intensity modulators 320-2 and 320-3, respectively, via silicon substrates (not shown). For example, a third ball lens (not shown) and a fourth ball lens (not shown) can be configured to collimate the low-noise, coherent optical beam 310-2 propagating there between.

In another implementation of this embodiment, the second end-face 114 of the first optical-fiber filter 101 is positioned in a third groove 297 in the silicon optical bench 150; the second end-face 114 of the second optical-fiber filter 102 is positioned in a fourth groove 298 in the silicon optical bench 150; and the second end-face 114 of the third optical-fiber filter 103 is positioned in a fifth groove 299 in the silicon optical bench 150. In one implementation of this embodiment, an integrated silicon optical bench is used to align optical beam outputs from the optical-fiber filters 101, 102, and 103 to the intensity modulators 320-1, 320-2, and 320-3, respectively, and to align the output of the intensity modulators 320-1, 320-2, and 320-3 to the fiber resonator coil 240.

In yet another implementation of this embodiment, only one optically transparent ball lens 161 is positioned in an etched region in the silicon optical bench 150. In another implementation of this embodiment, the first ball lens 161 and the second ball lens 162 are positioned in two separate etched regions of the silicon optical bench 150 and/or 151. In this manner, at least one optically transparent ball lens 161 couples the optical beams 310-1, 310-2, and/or 310-3 output from a second end-face 114 of at least one of the optical-fiber filters 101, 102 and/or 103, respectively, to at least one respective coil end-face 241, 242, or 241, respectively, of the fiber resonator coil 240.

Thus, silicon optical benches 151 and/or 150 include grooves (e.g., grooves 297-299, 152, 152, and/or etched regions 155) to position optical elements (e.g., first ball lens 161, second ball lens 162, beam splitters 271, 272(1-5), and/ or lens 270(1-2)), which align and direct at least two low-noise, coherent optical beams (e.g., 310(1-3)) output from the at least two optical-fiber filters (e.g., 101-103) to the first coil end-face 241 and the second coil end-face 242 and between the first coil end-face 241 and the second coil end-face 242. Housing the fiber resonator coil 240 on a silicon optical bench 150 provides a low cost implementation of the RFOG 10.

Figure 5:
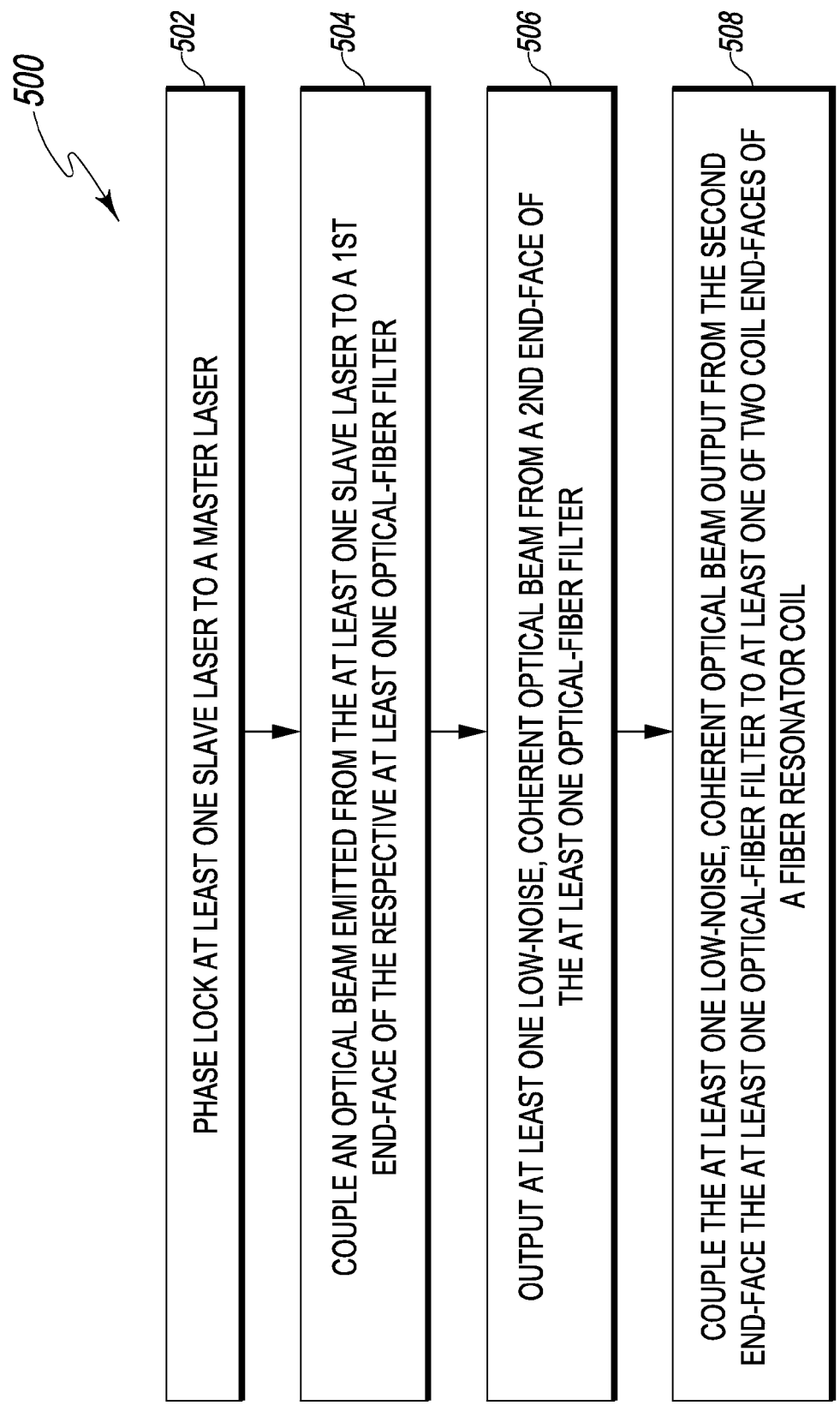
FIG. 5 is a flow diagram of one embodiment of a method to generate at least one low-noise, coherent optical beam for use in a resonator-fiber-optic gyroscope system in accordance with the present invention.

FIG. 5 is a flow diagram of one embodiment of a method 500 to generate at least one low-noise, coherent optical beam for use in a resonator-fiber-optic gyroscope system 10 in accordance with the present invention. The method 500 is described with reference to FIGS. 2 and 3 although it is to be understood that RFOGs configured with other coupling arrangements can be used.

At block 502, an optical beam 308 emitted from a master laser 200 is used to control at least one slave laser 121. The at least one slave laser 121 is locked to the master laser 200. The three slave lasers 121, 122, and 123 are locked to the master laser 200 with frequency separations determined by the resonance tracking servos 251. As shown in FIG. 3, the first slave laser 121 is locked to a first frequency $f_1=f+\Delta f-FSR$; the second slave laser 122 is locked to a second frequency $f_2=f+\Delta f$; and the third slave laser 122 is locked to a third frequency $f_3=f+\Delta f+FSR$.

At block 504, an optical beam 307 emitted from the at least one slave laser 121 is coupled to a respective at least one optical-fiber filter 101. Specifically, the optical beam 307 output from the at least one slave laser 120 is coupled to the first end-face 112 of the respective at least one optical-fiber filter 101.

As shown in FIG. 3, the output 307-1 from the first slave laser 121 (at a first frequency $f_1=f+\Delta f-FSR$) is coupled to the first end-face 112 of the first optical-fiber filter 101; the output 307-2 from the second slave laser 122 (at a second frequency $f_2=f+\Delta f$) is coupled to the first end-face 112 of the second optical-fiber filter 102; and the output 307-3 from the third slave laser 123 (at a third frequency $f_3=f+\Delta f+FSR$) is coupled to the first end-face 112 of the third optical-fiber filter 103.

At block 506, at least one low-noise, coherent optical beam 310 is output from the respective at least one optical-fiber filter 101. As shown in FIG. 3, a low-noise, coherent optical beam 310-1 is output from the second end-face 114 of the first optical-fiber filter 101; a low-noise, coherent optical beam 310-2 is output from the second end-face 114 of the second optical-fiber filter 102; and a low-noise, coherent optical beam 310-3 is output from the second end-face 114 of the third optical-fiber filter 103.

At block 508, the at least one low-noise, coherent optical beam 310-1 output from the second end-face 114 of the at least one optical-fiber filter 101 is coupled to at least one of two coil end-faces (such as, first coil end-face 241 and second coil end-face 242) of a fiber resonator coil 240 that has resonance frequencies that are sensitive to rotation rate.

As shown in FIG. 3, the low-noise, coherent optical beam 310-1 output from the second end-face 114 of the first optical-fiber filter 101 is coupled to the first coil end-face 241 of the fiber resonator coil 240 via the intensity modulator 320-1 and other optical elements positioned to align and direct the low-noise, coherent optical beam 310-1 output to the first coil end-face 241.

Likewise, FIG. 3 shows the low-noise, coherent optical beam 310-2 output from the second end-face 114 of the second optical-fiber filter 102 is coupled to the second coil end-face 242 of the fiber resonator coil 240 via the intensity modulator 320-2 and other optical elements positioned to align and direct the low-noise, coherent optical beam 310-2 output to the second coil end-face 242.

Likewise, FIG. 3 shows the low-noise, coherent optical beam 310-3 output from the second end-face 114 of the third optical-fiber filter 103 is coupled to the first coil end-face 241 of the fiber resonator coil 240 via the intensity modulator 320-3 and other optical elements positioned to align and direct the low-noise, coherent optical beam 310-3 output to the first coil end-face 241. In one implementation of this embodiment, there is no third slave laser 123 and there is no optical-fiber filter 103 in the RFOG system 10.

In one implementation of this embodiment, the first coil end-face 241 is positioned in a first groove 295 in a silicon optical bench 150 and a second coil end-face 242 is positioned in a second groove 296 in the silicon optical bench 150.

In another implementation of this embodiment, the first low-noise, coherent optical beam 310-1 is coupled to the first coil end-face 241 positioned in a first groove 295 in the silicon optical bench 150 via at least one ball lens 161 positioned in a first etched region 155 of the silicon optical bench 150; the second low-noise, coherent optical beam 310-2 is coupled to the second coil end-face 242 positioned in the second groove 296 in the silicon optical bench 150 via at least one ball lens 161 positioned in a second etched region 155 of the silicon optical bench 155; and the third low-noise, coherent optical beam 310-3 is coupled to the first coil end-face 241 positioned in the first groove 295 in the silicon optical bench 150 via at least one ball lens 161 positioned in a third etched region 299 of the silicon optical bench 155. In some embodiments of this latter configuration, there is no third low-noise, coherent optical beam 310-3 and no ball lens 161 positioned in a third etched region 299.

In yet another implementation of this embodiment, the intensity modulation function is done directly on the optical-fiber filter 101, 102 and 103. In embodiments of this latter case, the second end-face 114 of the first optical-fiber filter 101 is positioned in a third groove 297 in the silicon optical bench 150, the second end-face 114 of the second optical-fiber filter 102 is positioned in a fourth groove 298 in the silicon optical bench 150, and the second end-face 114 of the third optical-fiber filter 103 is positioned in a fifth groove 299 in the silicon optical bench 150. In some embodiments of this latter configuration, there is no third optical-fiber filter 103 is positioned in a fifth groove 299.

In this manner, an inexpensive RFOG system uses low cost laser diodes and improves optical filtering (by use of the optical-fiber filters) to reduce the phase noise of the laser diodes, so the low cost RFOG system has an improved performance. In one implementation of this embodiment, the optical-fiber filter 100 or 101 is used in a system that includes a single laser and a frequency shifter.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An optical-fiber filter comprising:
   an optical fiber having a first end-face and an opposing second end-face, the first end-face and the second end-face setting a fiber length, the first end-face and the second end-face being coated with reflective coatings, wherein, when an optical beam emitted from a laser is coupled into one of the first end-face or the second end-face, an optical beam output from the opposing end-face has a narrow linewidth and low frequency noise fluctuations, wherein the fiber length, the reflective coating on the first end-face, the reflective coating on the second end-face, a mode field size of the optical fiber, and a numerical aperture of the optical fiber are selected to increase the amount of power passed through the filter without generating stimulated Brillouin scattering in the optical fiber.

2. The filter of claim 1, wherein the reflective coating on the first end-face comprises a first plurality of dielectric layers, and wherein the reflective coating on the second end-face comprises a second plurality of dielectric layers.

3. The filter of claim 1, wherein the optical fiber is a polarization maintaining fiber.

4. A method of generating at least one low-noise, coherent optical beam for use in a resonator-fiber-optic gyroscope, the method comprising: phase locking at least one slave laser to a master laser; and coupling an optical beam emitted from the at least one slave laser to a respective at least one optical-fiber filter, wherein the at least one optical fiber filter includes an optical fiber having a first end-face and an opposing second end-face, the first end-face and the second end-face setting a fiber length, the first end-face and the second end-face being coated with reflective coatings, wherein, wherein the fiber length, the reflective coating on the first end-face, the reflective coating on the second end-face, a mode field size of the optical fiber, and a numerical aperture of the optical fiber are selected to increase the amount of power passed through the optical fiber filter without generating stimulated Brillouin scattering in the optical fiber, wherein the at least one low-noise, coherent optical beam is output from the at least one optical-fiber filter.

5. The method of claim 4, wherein coupling the optical beam output from the at least one slave laser to the optical-fiber filter comprises: coupling the optical beam emitted from the at least one slave laser to the first end-face of the respective at least one optical-fiber filter, wherein a respective at least one low-noise, coherent optical beam is output from the second end-face of the at least one optical-fiber filter.

6. The method of claim 5, further comprising coupling the at least one low-noise, coherent optical beam output from the second end-face of the at least one optical-fiber filter to at least one of two coil end-faces of a fiber resonator coil.

7. The method of claim 4, wherein the at least one slave laser includes at least a first slave laser and a second slave laser, the at least one optical-fiber filter includes at least a first optical-fiber filter and a second optical-fiber filter, the method further comprising:
   coupling the optical beam emitted from the first slave laser to the first end-face of the first optical-fiber filter, wherein a first low-noise, coherent optical beam is output from the second end-face of the first optical-fiber filter; and
   coupling the optical beam emitted from the second slave laser to the first end-face of the second optical-fiber filter, wherein a second low-noise, coherent optical beam is output from the second end-face of the second optical-fiber filter.

8. The method of claim 7, further comprising:
   coupling an optical beam emitted from a third slave laser to a first end-face of a third optical-fiber filter, wherein a third low-noise, coherent optical beam is output from a second end-face of the third optical-fiber filter; and
   coupling the third low-noise, coherent optical beam to a first coil end-face of the fiber resonator coil.

9. The method of claim 7, further comprising:
   coupling the first low-noise, coherent optical beam to a first coil end-face of a fiber resonator coil; and
   coupling the second low-noise, coherent optical beam to a second coil end-face of the fiber resonator coil.

10. The method of claim 9, further comprising:
    positioning the first coil end-face in a first groove in a silicon optical bench; and
    positioning the second coil end-face in a second groove in the silicon optical bench.

11. The method of claim 10, further comprising:
    positioning the second end-face of the first optical-fiber filter in a third groove in the silicon optical bench; and positioning the second end-face of the second optical-fiber filter in a fourth groove in the silicon optical bench.

12. The method of claim 9, wherein coupling the first low-noise, coherent optical beam to the first coil end-face of a fiber resonator coil comprises:
coupling the first low-noise, coherent optical beam to the first coil end-face positioned in a first groove in a silicon optical bench via at least one ball lens positioned in a first etched region of the silicon optical bench; and
wherein coupling the second low-noise, coherent optical beam to a second coil end-face of the fiber resonator coil comprises:
coupling the second low-noise, coherent optical beam to the second coil end-face positioned in a second groove in the silicon optical bench via at least one ball lens positioned in a second etched region of the silicon optical bench.

13. The method of claim 12, wherein the at least one ball lens positioned in the first etched region of the silicon optical bench includes a first ball lens and a second ball lens and wherein the at least one ball lens positioned in the second etched region of the silicon optical bench includes a third ball lens and a fourth ball lens, the method further comprising:
positioning the first ball lens and the second ball lens to collimate the low-noise, coherent optical beam propagating there between; and
positioning the third ball lens and the fourth ball lens to collimate the low-noise, coherent optical beam propagating there between.

14. A resonator-fiber-optic gyroscope comprising:
a frequency stabilized master laser emitting a reference optical beam having low phase noise;
at least two slave lasers arranged so that the reference optical beam controls the respective at least two slave lasers;
at least two optical-fiber filters arranged so that optical beams emitted from the at least two slave lasers are coupled to the respective optical-fiber filters, wherein low-noise, coherent optical beams are output from the respective optical-fiber filters; and
a fiber resonator coil having a first coil end-face and a second coil end-face,
wherein an optical beam output from one of the at least two optical-fiber filters is coupled to the first coil end-face of the fiber resonator coil, and
wherein an optical beam output from another one of the at least two optical-fiber filters is coupled to the second coil end-face of the fiber resonator coil.

15. The resonator-fiber-optic gyroscope of claim 14, wherein the at least two optical-fiber filters each comprise an optical fiber having a first end-face and an opposing second end-face, the first end-face and the second end-face setting a fiber length, the first end-face and the second end-face being coated with reflective coatings, wherein the fiber length, the reflective coating on the first end-face, the reflective coating on the second end-face, a mode field size of the optical fiber, and a numerical aperture of the optical fiber are selected to prevent generation of non-linear effects in the optical fibers of the at least two optical-fiber filters.

16. The resonator-fiber-optic gyroscope of claim 14, wherein the optical beam output from a first slave laser is coupled to a first end-face of a first optical-fiber filter, wherein a first low-noise, coherent optical beam output from a second end-face of the first optical-fiber filter is coupled to the first coil end-face of the fiber resonator coil, and
wherein the optical beam output from a second slave laser is coupled to a first end-face of a second optical-fiber filter, wherein a second low-noise, coherent optical beam output from a second end-face of the second optical-fiber filter is coupled to the second coil end-face of the fiber resonator coil.

17. The resonator-fiber-optic gyroscope of claim 16, wherein the optical beam output from a third slave laser is coupled to a first end-face of a third optical-fiber filter, wherein a third low-noise, coherent optical beam output from a second end-face of the third optical-fiber filter is coupled to the first coil end-face of the fiber resonator coil.

18. The resonator-fiber-optic gyroscope of claim 14, further comprising:
a silicon optical bench including grooves to optically align the first coil end-face and the second coil end-face to respective optical-fiber filters.

19. The resonator-fiber-optic gyroscope of claim 18, further comprising:
at least one optically transparent ball lens positioned in a respective at least one etched region in the silicon optical bench, wherein the at least one optically transparent ball lens couples the optical beam output from a second end-face of at least one of the at least two optical-fiber filters to at least one of the first coil end-face and the second coil end-face of the fiber resonator coil.

* * * * *